Jan. 13, 1942.    W. O. HEBLER    2,269,850
GAS ANALAYSIS APPARATUS
Filed Nov. 21, 1939
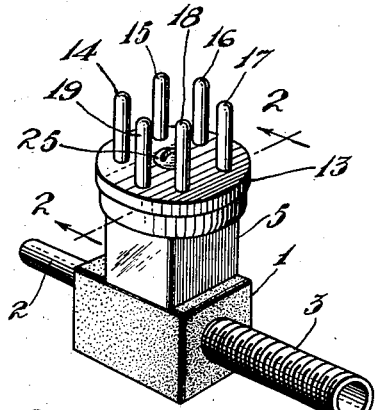
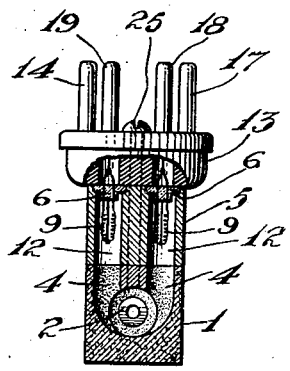
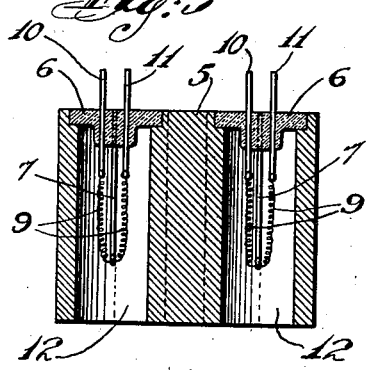
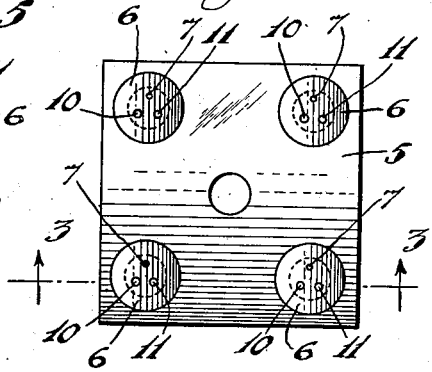
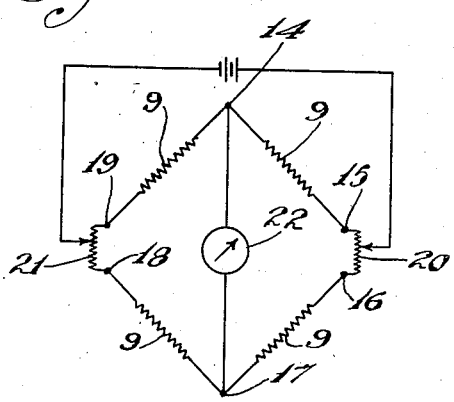
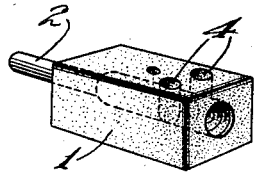
INVENTOR
William O. Hebler,
BY Fredk C. Fischer
ATTORNEY Patented Jan. 13, 1942

2,269,850

UNITED STATES PATENT OFFICE 2,269,850

GAS ANALYSIS APPARATUS

William O. Hebler, Westfield, N. J.

Application November 21, 1939, Serial No. 305,446

5 Claims. (Cl. 73—51)

This invention relates to improvements in apparatus for analyzing gases by the thermal conductivity method.

There have been many separate developments in the past, said developments relating to proper regulation of the flow of the fluids through a gas analysis cell, suitable filtration methods, compensating means to minimize errors due to outside temperature effects or the inherent differences in resistors due to manufacturing. Other compensating means have pertained to the regulation of the resistors in order to obtain proper relationship of the resistors to the side walls of the cells so that proper heat dissipating effects can be obtained in the standard and analysis cells. Other developments have involved the use of quartz having a zero temperature coefficient to maintain rigidity of the resistor within the cell and also to prevent corrosion by various gases. Other developments have utilized filaments or resistors where the resistors ran horizontal to the perpendicular axis of the cell to provide increased sensitivity. Some resistors were developed which were spirally wound and could be suitably moved from an outside source at the cell to change the convolutional area of the resistor, thereby changing the heat dissipation to provide uniformity of heat dissipation.

For many years slow but important developments have been made by individual inventors and investigators, all of which have contributed greatly to the art of electrical gas analysis and only time has revealed that many manifold and complicated features and procedures are inextricably bound in order to obtain a common result. A great deal of stress has been placed, in the past, on corrosion of the walls of a thermal conductivity cell, thereby requiring plating of various metals or providing the inner lining of cells with glass and other comparable material. It is pointed out that practically all of the developments have been directed toward one goal, and that is, constancy of operation with the possibility also of reducing production cost. Invariably, however, production costs were not greatly reduced so that the ultimate devices could be placed in fields where the public would be greatly benefited. In other words, the ultimate cost of production was so high, and the care with which the apparatus had to be handled was of such importance, that not until the following discovery, which is the object of this invention was it possible to place instruments of this kind into the hands of individuals maintaining for instance, domestic oil, coal, or gas-fired burners.

Exhaust gas analyzers have been employed in garages, but the sensitivity required for analysis of hydrogen and carbon monoxide combined does not require a highly sensitive cell as would be necessary when $CO_2$ only is to be analyzed. There has been tremendous success in the automotive application of the thermal conductivity cell.

It is desired to point out that this invention relates more particularly to a complete gas analysis cell structure, the details of which are to provide a complete analysis cell to perform in a manner required in daily use. To eliminate any one feature would destroy its ultimate operation.

Heretofore, gas analysis cells have been permanently installed in apparatus for testing gases and when it was necessary to repair or adjust the cell, the cell had to be removed from its permanent installation, which required skill and time. Also, cells heretofore used in analysis apparatus have been affected by changes in temperature, and adjustments could not be made by persons unskilled in the adjusting of the apparatus.

It is an object of this invention to provide a gas analysis cell which is constructed in several parts which can be detached from each other so that each part of the cell can be adjusted or repaired without affecting the other part.

A further object is to provide in a gas analysis apparatus an analysis cell having means to enable the cell to be readily detached or attached to other parts of the apparatus without necessitating the breaking of electrical connections or the use of tools.

These and other advantageous objects, which will later appear, are accomplished by the simple and practical construction and arrangement of parts hereinafter described and exhibited in the accompanying drawing, forming part hereof, and in which:

Fig. 1 is a perspective view of a gas analysis cell embodying my invention,

Fig. 2 is a sectional view taken on line 2—2 of Fig. 1,

Fig. 3 is a sectional view taken on line 3—3 of Fig. 4,

Fig. 4 is a plan view of one section of the cell,

Fig. 5 is a perspective view of a filament or resistor and the mounting therefor, for use in a cell, Fig. 6 is a perspective view of another section of the cell, and Fig. 7 is a wiring diagram of an electrical circuit used in the gas analysis apparatus.

Referring to the drawing, the cell is shown to include a block 1 preferably made of insulating material such as Bakelite, fiber, glass or similar material. Passing through block 1 is a tube having an entrance portion 2 with an enlarged exhaust portion 3. The block is provided with a pair of apertures 4 communicating with the tube, (see Fig. 6).

Attached to the block 1 by a suitable cementitious material is a cell block 5 having drilled therein four chambers 12, two of which communicate with the apertures 4. The cell block 5 may be made of metal such as brass, lead, copper or similar material; however, the block can be made of fiber, Bakelite, glass or similar materials as it has been found that a material of high conductivity is not necessarily required for the cell block, if the filament is of sufficiently small mass and high enough temperature coefficient.

Mounted in each of the chambers 12 is a cap 6 having extending downward therefrom a supporting wire 7 with a loop 8 at the lower end thereof engaging a filament or resistor 9, which has lead wires 10 and 11 passing through the cap 6.

The lead wires 10 and 11 in each of the resistors in the four chambers are connected on the lower side of a plug 13 which is similar to the pronged connector of a radio tube. On the underside of the plug 13 is formed a Wheatstone bridge arrangement shown in Fig. 7, the junction points of the bridge being connected to the prongs 14, 15, 16, 17, 18 and 19. Bridging two of the prongs is a galvanometer 22. The Wheatstone bridge is included in a circuit having potentiometers 20 and 21, the terminals of which are connected to the bridge by prongs 18, 19, and 15 and 16.

Two of the chambers 12 in cell block 5 are closed by resting the block 5 upon the upper surface of block 1, and these chambers form the standard cells. The other two chambers 12 communicate with the apertures 4 and gases are diffused therefor from the pipe 3 into the chambers which are the analysis cells.

The filament is of extremely small mass and is free to respond almost instantaneously to any change in gas percentage or concentration, because there is little or no temperature radiant along the axis of the wire. Where a filament is long and massive or the convulsions are of the order of $\frac{1}{8}$ inch in diameter instead of $\frac{1}{64}$ inch in diameter there is a temperature radiant established along the axis of the wire, and hence, the time sensitivity is greatly increased.

By making the cell in three parts as shown, the three parts of which are held together by means of a screw 25 as shown in Fig. 2, access can be readily obtained to the chambers 12 by removing block 1 from cell block 5, thus enabling convenient adjusting of the filaments 9. Heretofore, in gas analysis cells this was not possible and the adjusting of a filament was a task requiring great skill and often much time. With the analysis cell as herein described, should adjusting or repair be necessary, all that is required is that the user of the apparatus remove the prongs from a socket in the apparatus which disconnects the cell from the circuit shown in Fig. 7. The cell can then be returned to the factory for adjusting or if desired adjustments can be made by removing screw 25 to enable access to the cell chambers 12. With gas analysis apparatus heretofore used, if adjustments were necessary the entire apparatus had to be returned to persons skilled in the art of adjusting filaments and other parts of the apparatus.

The structure herein described insures more accurate determinations of the percentage or concentration of the gas being analyzed as the small mass of the filament and the arrangement of the blocks eliminate erratic heat dissipating effects.

The wire supports 7 and 8 maintain the rigidity of the small filament 9; and also after the cell is connected into a Wheatstone bridge circuit, the support 7 can be moved in such a manner that it will displace filament 9 slightly, and by observing the galvanometer 22, the adjusting of the supports 7 enables the establishment of identical heat dissipation in all of the cell chambers. This is of extreme importance and is possible by reason of the building of the analysis cell in three parts so that the cell block 5 can be detached to enable access to the chambers 12. With gas analysis cells as heretofore provided, such an adjustment was not possible.

In the past, one of the common errors in making thermometrical symmetry adjustment has been to disregard entirely the cooling effect caused by heat conduction of connecting leads which are connected to the lead-in wires 10 and 11 for use as terminals leading to the Wheatstone bridge circuit. By using a plug having prongs such as the plug 13, which is of a standard size and shape, when the thermometrical symmetry adjustment is made, all features are taken into consideration.

From the above description it will be seen that there has been provided an analysis cell of the thermal conductivity type which can be readily included in an electrical circuit without requiring soldering operations or the like. The cell can be manufactured at low cost and by reason of being built in several detachable parts adjustment of the small filaments of the cell chambers 12 can be readily accomplished.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. A gas analysis cell of the thermal conductivity type, comprising a block of insulating material having a tube passing therethrough, and a pair of apertures communicating with the tube, a second block having four cell chambers therein and positioned on the first block so that two of said chambers communicate with said apertures, said block of insulating material closing the other two chambers, filaments mounted in said chambers, said filaments forming the branches of a Wheatstone bridge, a plug mounted on said second block and having a plurality of prongs connected to said filaments, and means to detachably connect said plug and the two blocks together.

2. In a gas analysis cell, a first block having a tube passing therethrough and a pair of apertures communicating with the tube, a second block having four cell chambers, said second block being mounted upon the first block so that two of the chambers communicate with said apertures, said first block closing the other two chambers, filaments mounted in said chambers, each of said filaments having a wire support extending down into the chamber, said support enabling adjustment of the filament, and means to detachably connect said blocks together.

3. In a gas analysis cell comprising a block having a passage through which gas may flow, said block having a pair of apertures communicating with said passage, a second block having four chambers therein, two of said chambers communicating with said apertures, said first mentioned block closing the other two chambers, filaments mounted in said chambers, a pronged adapter mounted on said second block, said filaments being connected to the prongs of the adapter, and means to connect the adapter and the two blocks together.

4. A gas analysis cell of the thermal conductivity type, comprising a block of insulating material having a tube passing therethrough and a pair of apertures communicating with the tube, a second block having four cell chambers therein and positioned on the first block so that two of said chambers communicate with said apertures, said block of insulating material closing the other two chambers, each of said chambers having a cap mounted therein, a coiled filament depending from the cap and having a pair of terminals passing through the cap, a supporting wire extending downward from the cap and having at its lower end a loop engaging said filament, said filaments in said chambers forming the branches of a Wheatstone bridge, a plug mounted on said second block and having a plurality of prongs connected to the terminals of said filaments, and means to detachably connect said plug and the two blocks together.

5. In a gas analysis cell of the thermal conductivity type, a first block having a tube passing therethrough and a pair of apertures communicating wtih said tube, a second block having four cell chambers, said second block being mounted upon the first block so that two of the chambers communicate with said apertures, said first block closing the other two chambers, means closing the ends of the chambers opposite the tube, and filaments mounted in said chambers, said filaments forming the branches of a Wheatstone bridge.

WILLIAM O. HEBLER.